(12) United States Patent
Meek et al.

(10) Patent No.: US 8,683,074 B2
(45) Date of Patent: Mar. 25, 2014

(54) STREAM OPERATOR

(75) Inventors: Colin Joseph Meek, Kirkland, WA (US); Mohamed Hassan Ali, Kirkland, WA (US); Galex Sunyul Yen, Issaquah, WA (US); Ciprian Gerea, Seattle, WA (US); Balan Sethu Raman, Redmond, WA (US); Jonathan David Goldstein, Woodinville, WA (US); Badrish Chandramouli, Bellevue, WA (US); Tomer Verona, Redmond, WA (US); Torsten Walther Grabs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 13/108,005

(22) Filed: May 16, 2011

(65) Prior Publication Data

US 2012/0297080 A1    Nov. 22, 2012

(51) Int. Cl.
*G06F 15/16* (2006.01)
(52) U.S. Cl.
USPC .......................................... 709/232; 709/231
(58) Field of Classification Search
USPC .................. 709/231, 232; 370/395.21, 395.4, 370/395.43; 375/240.08, 369, 356
See application file for complete search history.

(56) References Cited

U.S. PATENT DOCUMENTS

| 7,673,065 | B2 | 3/2010 | Srinivasan et al. |
| 7,870,167 | B2 | 1/2011 | Lu et al. |
| 2002/0128925 | A1 | 9/2002 | Angeles |
| 2002/0198679 | A1* | 12/2002 | Victor et al. .................. 702/176 |
| 2006/0230170 | A1* | 10/2006 | Chintala et al. ............... 709/231 |
| 2009/0070163 | A1* | 3/2009 | Angell et al. ..................... 705/7 |
| 2009/0070785 | A1 | 3/2009 | Alvez et al. |
| 2009/0077229 | A1* | 3/2009 | Ebbs ............................. 709/224 |
| 2009/0106218 | A1 | 4/2009 | Srinivasan et al. |
| 2009/0125550 | A1* | 5/2009 | Barga et al. ................ 707/104.1 |
| 2009/0193101 | A1* | 7/2009 | Munetsugu et al. .......... 709/219 |
| 2009/0292877 | A1* | 11/2009 | Piper et al. .................... 711/118 |
| 2010/0169495 | A1* | 7/2010 | Zhang et al. .................. 709/227 |
| 2010/0287013 | A1* | 11/2010 | Hauser ............................. 705/7 |
| 2012/0124353 | A1* | 5/2012 | Rehman ........................... 713/1 |

OTHER PUBLICATIONS

Grabs, et al., "Introducing Microsoft StreamInsight", Retrieved at <<http://asfug.org/Documents/IntroducingMicrosoftStreamInsights.pdf>>, Sep. 2009, pp. 26.

(Continued)

*Primary Examiner* — Gary Mui
*Assistant Examiner* — Kabir Jahangir
(74) *Attorney, Agent, or Firm* — Nicholas Chen; Kate Drakos; Micky Minhas (57) ABSTRACT

Aspects of the subject matter described herein relate to stream operators. In aspects, a stream event is received. Based on a timestamp associated with the stream event and the number of stream operators that have asked to be activated prior to or at the timestamp, zero or more stream objects are informed of one or more time events and torn down if no longer needed. In addition, a destination stream operator is instantiated, if needed, data (e.g., the timestamp and packet, if any) corresponding to the stream event is provided to a stream operator, output data, if any, is received from the stream operator, and the stream operator is torn down if it no longer needs state data between invocations.

20 Claims, 7 Drawing Sheets

(56) References Cited

OTHER PUBLICATIONS

"Complex Event Processing in the Real World", Retrieved at <<http://www.oracle.com/us/technologies/soa/oracle-complex-event-processing-066421.pdf>>, White Paper, Sep. 2007, pp. 13.

"Overview of the Oracle Complex Event Processing Programming Model", Retrieved at <<http://download.oracle.com/docs/cd/E13213_01/wlevs/docs30/create_apps/overview.html>>, Retrieved Date: Mar. 18, 2011, pp. 8.

Hong, Mingsheng., "Expressive and scalable event stream processing", Retrieved at <<http://www.cs.cornell.edu/~mshong/papers/thesis.pdf>>, Jan. 2009, pp. 243.

Wu, et al., "High-Performance Complex Event Processing over Streams", Retrieved at <<http://citeseer.ist.psu.edu/viewdoc/download;jsessionid=F42B3AB717CCF401D32623DC1CDF2F34?doi=10.1.1.90.3095&rep=rep1&type=pdf>>, International Conference on Management of Data and Symposium on Principles Database and Systems, Jun. 27-29, 2006, pp. 407-418.

Gyllstrom, et al., "SASE: Complex Event Processing over Streams", Retrieved at <<http://www-db.cs.wisc.edu/cidr/cidr2007/papers/cidr07p46.pdf>>, Third Biennial Conference on Innovative Data Systems Research, Jan. 7-10, 2007, pp. 407-411.

Vincent, Paul., "Complex Event Processing Tutorial", Retrieved at <<http://www.omg.org/news/meetings/workshops/Real-time_WS_Final_Presentations_2008/Tutorials/00-T6_Vincent.pdf>>, Workshop on Distributed Object Computing for Real-time and Embedded Systems, Jul. 14-16, 2008, pp. 1-69.

Chakravarthy, et al., "Composite events for active databases: Semantics, contexts and detection", Retrieved at <<http://www.vldb.org/conf/1994/P606.PDF>>, Proceedings of 20th International Conference on Very Large Data Bases, Sep. 12-15, 1994, pp. 606-617.

Barga, et al., "Consistent Streaming Through Time: A Vision for Event Stream Processing", Retrieved at <<http://research.microsoft.com/apps/pubs/default.aspx?id=70517>>, Third Biennial Conference on Innovative Data Systems Research, Jan. 7-10, 2007, pp. 363-374.

Goldstein, et al., "Operator Algorithm Design for Speculative Stream Processing", Retrieved at <<http://citeseerist.psu.edu/viewdoc/summary?doi=10.1.1.102.3913, Jan. 7, 2007, pp. 23.

* cited by examiner

STREAM OPERATOR

BACKGROUND

In computer stream processing, a stream may be viewed as a relation or table that changes over time. Each entry in the stream may include a payload and potentially a timestamp. The timestamp indicates a time at which the entry occurred, although the time may have no bearing on a time in the real world. The timestamp may simply indicate a value by which an entry may be ordered relative to other entries in the stream. The payload may include one or more fields that include data associated with the entry.

Many real-world examples of streams exist. For example, a computer monitoring system may generate a stream of events that relate to the health of a computer system. As another example, the Web sites accessed by Internet users may be represented as a stream of events. Extracting and using the information contained in streams is challenging.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to stream operators. In aspects, a stream event is received. Based on a timestamp associated with the stream event and the number of stream operators that have asked to be activated prior to or at the timestamp, zero or more stream objects are informed of one or more time events and torn down if no longer needed. In addition, a destination stream operator is instantiated, if needed, data (e.g., the timestamp and packet, if any) corresponding to the stream event is provided to a stream operator, output data, if any, is received from the stream operator, and the stream operator is torn down if it no longer needs state data between invocations.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
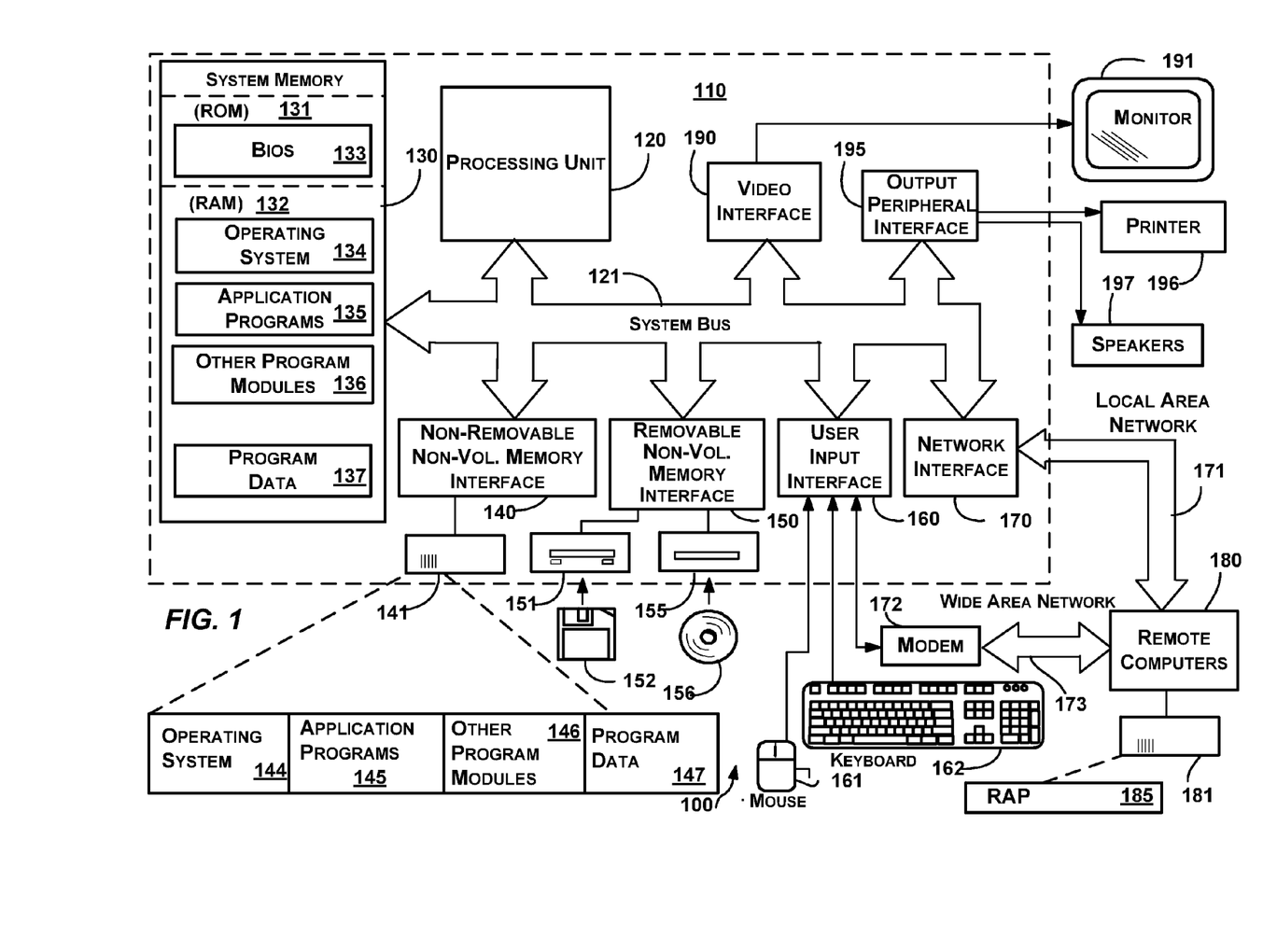
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

Stream Processing

Figure 2:
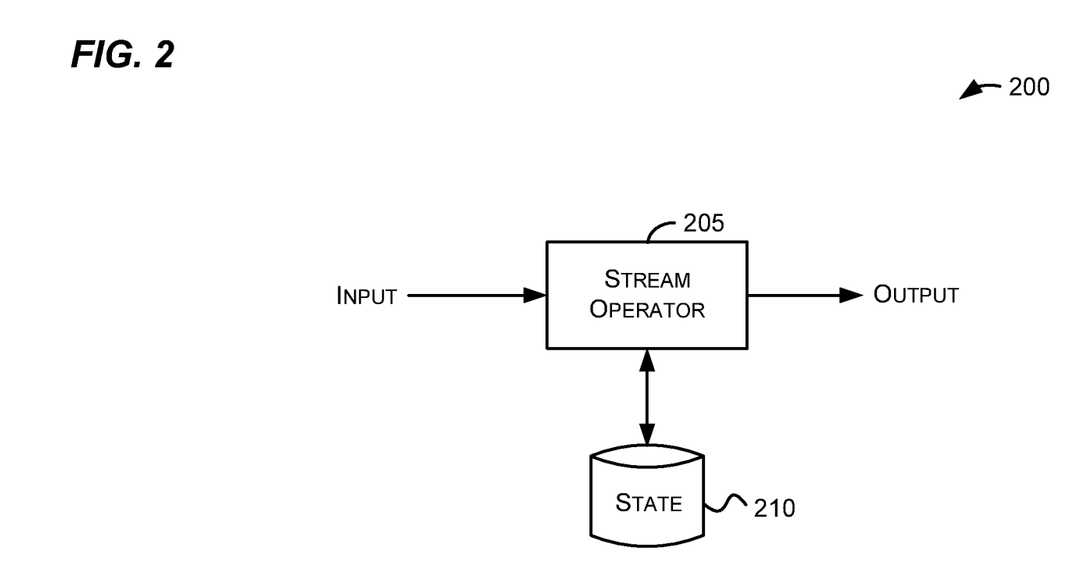
FIG. 2 is a block diagram that generally represents an environment in accordance with aspects of the subject matter described herein.

As mentioned previously, extracting and using information from streams is challenging. FIG. 2 is a block diagram that generally represents an environment in accordance with aspects of the subject matter described herein. The components illustrated in FIG. 2 are exemplary and are not meant to be all-inclusive of components that may be needed or included. In other embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

Turning to FIG. 2, the environment 200 includes a stream operator 205 and state data 210. The stream operator 205 is a component that receives input, has access to the state data 210, and may potentially generate output based on the input and state data 210.

As used herein, the term component is to be read to include hardware such as all or a portion of a device, a collection of one or more software modules or portions thereof, some combination of one or more software modules or portions thereof and one or more devices or portions thereof, and the like.

A component may include or be represented by code. Code includes instructions that indicate actions a computer is to take. Code may also include information other than actions the computer is to take such as data, resources, variables, definitions, relationships, associations, and the like.

The input to the stream operator 205 may include an entry of a stream. For example, as an entry of the stream, the input may include a timestamp such as an integer together with one or more fields that include data. As mentioned previously, the timestamp may be a proxy for time and may not be actual real time. The term proxy is used as the timestamp may be used to order entries relative to other entries having timestamps.

Furthermore, a timestamp may be implicit. For example, in one embodiment, the sequence in which event payloads are received may constitute an implicit timestamp as event payloads that are received earlier may be assumed to have occurred earlier. In addition, a timestamp may be a wall-clock time or derived from a wall-clock time.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

After receiving some input, the stream operator 205 may update the state data 210 and generate output data. The state data 210 may include data that the stream operator 205 seeks to persist between invocations of the stream operator 205. For example, if the stream operator 205 performs a smoothing function for curves, the stream operator 205 may store one or more previous values in the state data 210 for use in performing the smoothing function. As another example, if the stream operator performs an averaging function, the stream operator 205 may store one or more values in the state data 210 for use in performing the averaging function. As yet another example, if the stream operator counts events, the state data 210 may include a count value that is updated each time the stream operator 205 receives input corresponding to an event.

The examples above regarding state data 210 are not intended to be all-inclusive or exhaustive of the types of data that may be included in the state data 210. Indeed, based on the teachings herein, those skilled in the art may recognize many other types of data that may be stored in the state data 210 to be used by the stream operator 205 in generating output.

Furthermore, the stream operator 205 is not required to store any data in the state data 210. For example, if the stream operator 205 simply squares its input, there may be no need to store data in the state data 210.

Based on the input and/or the state data 210, the stream operator 205 may generate output. In one embodiment, the output data is devoid of timestamp information. For example, even though the input includes a timestamp, the stream operator 205 may refrain from putting a timestamp in the output data. In this embodiment, the stream operator 205 may rely on a streaming framework to determine a timestamp for the output data. For example, the streaming framework may assign the output data to the timestamp that triggered the input data that was provided to the stream operator 205.

In another embodiment, the stream operator 205 may provide time data. This time data may include a timestamp or other data that indicates a time at which the output data is to be treated as being generated. This timestamp may be previous to, equal to, or after the input timestamp.

The output data may be provided to another stream operator (not shown) that treats the output data as input data and performs operations on the output data to potentially generate yet other output data.

The stream operator 205 may, upon demand or automatically, provide additional data. This additional data may include:

1. Data that indicates whether the state data 210 may be discarded. For example, if the operator averages twenty data points and then terminates, after receiving the twenty data points and providing the output data, the stream operator 205 may indicate that the state data 210 may be discarded. In response, the streaming framework may free the memory associated with the state data 210 as well as the memory, if any, allocated to code of the stream operator 205.

2. Data that indicates a time at which the stream operator 205 is to be activated even if no other event for the stream operator 205 has occurred. For example, in providing output data, the stream operator 205 may also provide data that indicates a future time at which the operator is to be activated. For example, the stream operator 205 may be waiting for another event to be received within a specified time period of the input just received. If the event does not occur within the time period, the stream operator 205 may want to be activated so that it can release its resources, perform computations, update internal state, produce output events, or the like. To do this the stream operator 205 may provide time data that indicates a future activation time. If the expected event data is not received before the future activation time, the stream operator 205 is still be activated by the streaming framework at the future activation time.

Figure 3:
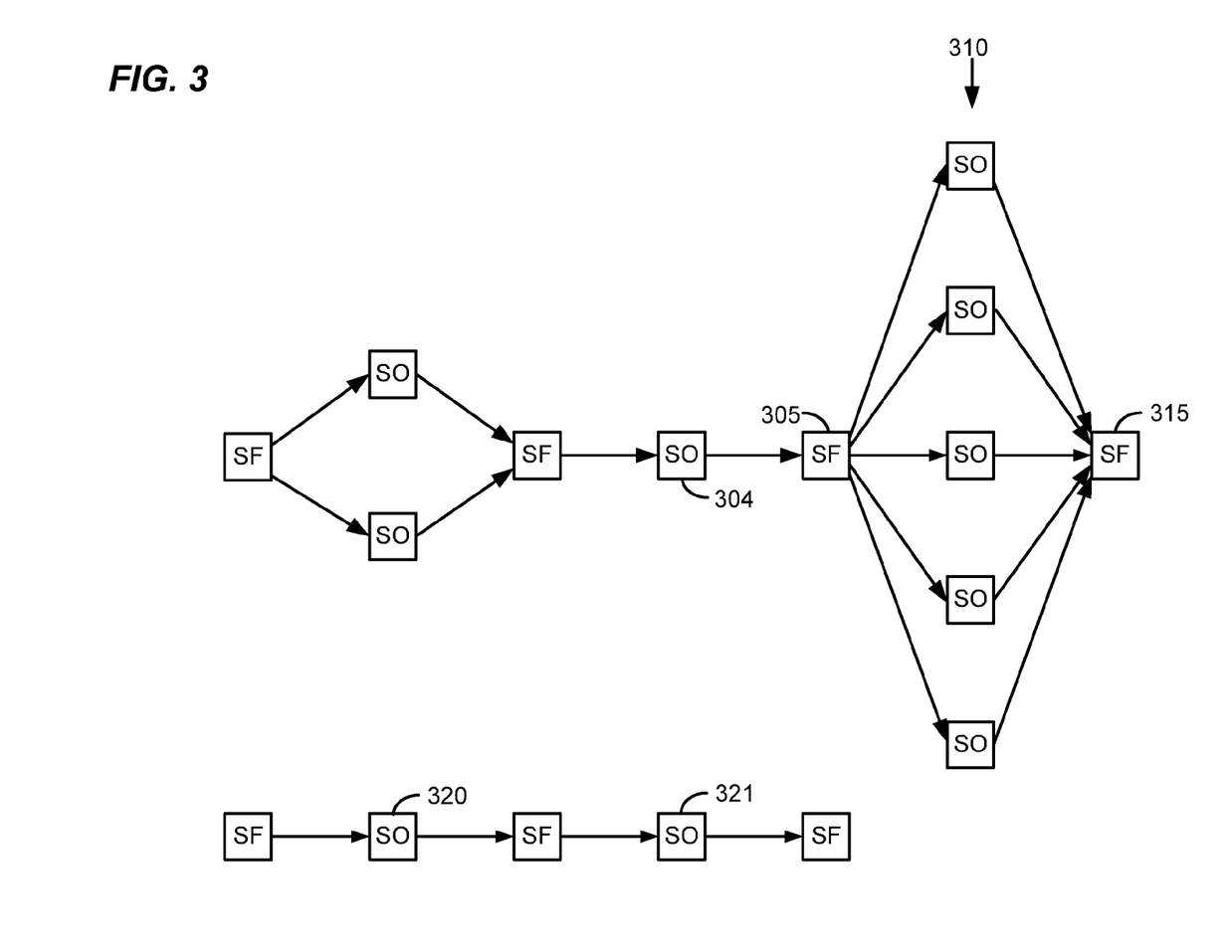
FIG. 3 is a block diagram that includes a collection of streaming components connected via a streaming framework in accordance with aspects of the subject matter described herein.

FIG. 3 is a block diagram that includes a collection of streaming components connected via a streaming framework in accordance with aspects of the subject matter described herein. The blocks labeled with SO represent streaming objects while the blocks labeled with SF represent the streaming framework. The streaming framework may be thought of as one or more components that are responsible for various actions associated with the streaming objects. The actions may include, for example, providing input to the streaming objects, receiving output from the streaming objects, instantiating streaming objects, tearing down streaming objects, and the like. Some other exemplary actions components of the streaming framework may perform include database-like operations such as joining, projecting, selecting, windowing, and the like.

The diagram illustrates a logical representation of data being passed from the streaming objects to the stream framework and on to more streaming objects. In implementation, the streaming framework may be implemented as computer code that when executed performs the actions described below.

For example, the streaming framework may instantiate, pause, resume, and tear down streaming objects as needed. To avoid consuming memory, CPU cycles, and other resources, streaming objects may be instantiated on an as needed basis. For example, when stream data is received that affects a stream object, the streaming framework may determine the affected stream object, instantiate the stream object, and provide the stream data to the stream object.

After the stream object has performed its work for the stream data, the streaming framework may obtain the output data and query the stream object as to whether the stream object may be torn down. If the stream object indicates that it no longer needs to exist (e.g., to maintain state), the streaming framework may free the memory associated with the stream object and make that memory available for other allocations.

In general, the streaming framework may receive the output from one or more stream objects and provide that data to one or more other stream objects. For example, the streaming framework component 305 may receive the output from the stream object 304 and provide that output to one or more of the stream objects 310.

The streaming framework component 305 may determine which of the stream objects 310 to provide the output of the stream object 304 based on data in the output and information associated with the stream objects 310. For example, the stream objects 310 may be partitioned based on the alphabet such that each stream object handles stream data for last names within ranges of the alphabet. As another example, the stream objects 310 may be partitioned based on numerical value. As yet another example, the stream objects 310 may be partitioned based on a set of conditions that are applied to the data.

Upon receipt of output data from the stream object 304, the streaming framework component 305 may determine which of the stream objects 310 to provide the output data and may then instantiate those stream objects as needed and provide them the output data as input.

After receiving output from one of the stream objects 310, the streaming framework component 315 may determine whether the stream object may be torn down. Tearing down a stream object means freeing the memory and other resources, if any, associated with the stream object. For example, in conjunction with providing the output, the stream object may also provide a time at which the stream object is to be activated again. In one embodiment, each stream object may be responsible for implementing an interface by which the stream object may be called to ask if the stream object can be torn down. In another embodiment, stream objects may indicate whether they can be torn down by calling a method of the streaming framework or by passing this information in data output by the stream objects.

Similarly, in one embodiment, each stream object may be responsible for implementing an interface by which the stream object may be called to ask if the stream object wants to be activated in at a future time and what that future time is. In another embodiment, stream objects may indicate future times for activation by calling a method of the streaming framework or by passing this information in data output by the stream objects.

If a stream object indicates that it is to be activated in the future, the streaming framework may refrain from tearing down the stream object and may instead put the stream object in a sleep state (or let it remain in one if it is already in a sleep state) until either more stream data is received from the stream object or until the activation time is reached.

Placing a stream object into a sleep state may include, for example, writing data representing the object to persistent storage, serializing the state to the persistent storage, and releasing memory associated with the object. Subsequently, the stream object may be resumed (on the same or a different computer node) by allocating memory for the stream object, reading the data from the persistent storage to create the stream object, and reading the state from the persistent storage.

If the stream object indicates that it can be torn down, a streaming framework component may free the memory associated with the stream object. If the stream object has provided a destroy method, the streaming framework component may call the destroy method prior to tearing down the stream object. In this manner, the stream object may be called just prior to tearing it down to do any internal actions (e.g., freeing objects, sending messages, or the like) it desires.

In one embodiment, the streaming framework is responsible for assigning a timestamp to the output data of a stream object. In one implementation, the streaming framework may assign the timestamp for the output data to be timestamp of the input stream data that was provided to the stream object just prior to the stream object providing the output data. In another embodiment, the stream object may determine a timestamp for the output data and may provide this timestamp to the streaming framework.

Figure 4:
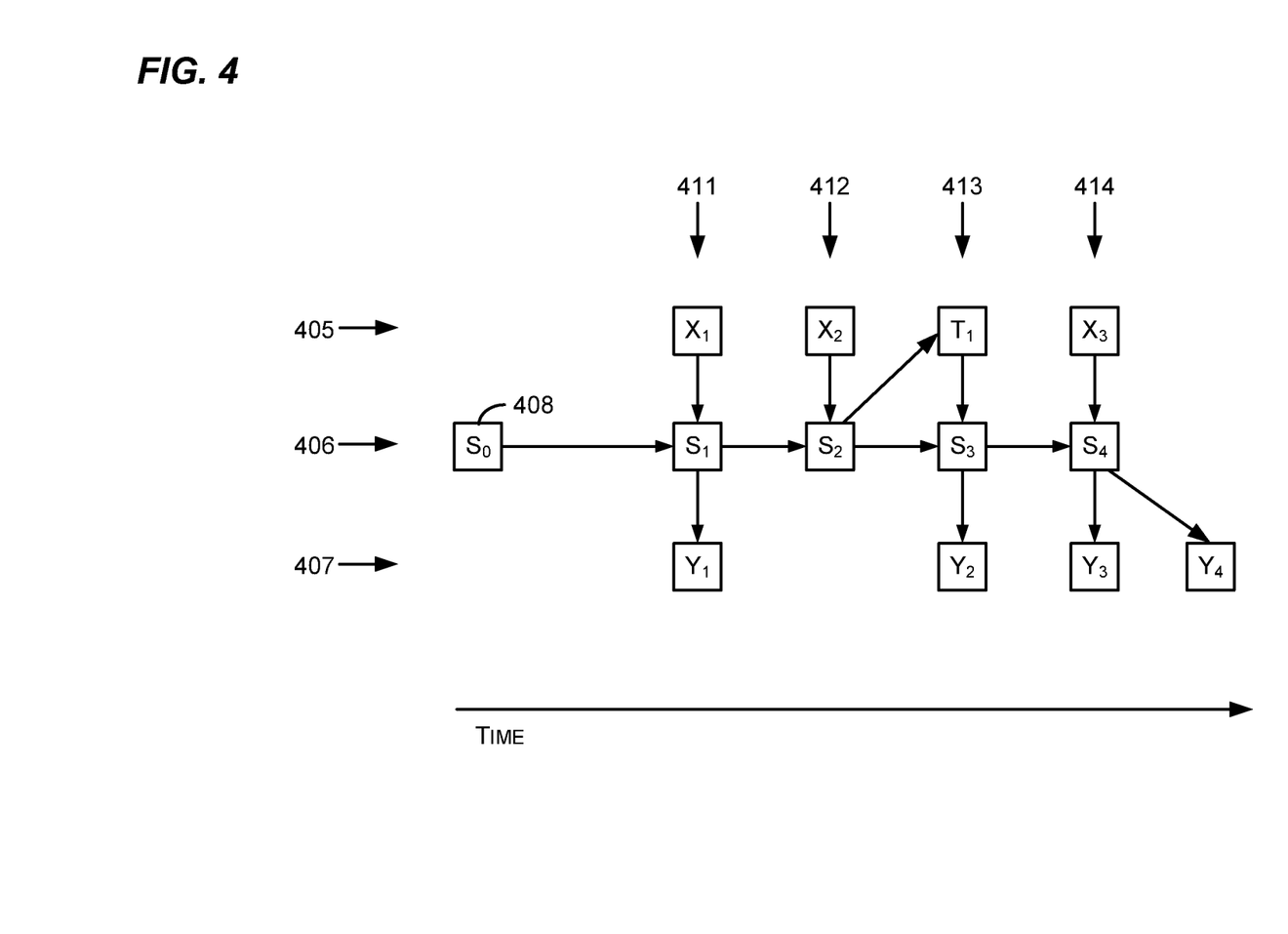
FIG. 4 is a block diagram that generally represents interactions and data associated with a stream object in accordance with aspects of the subject matter described herein.

FIG. 4 is a block diagram that generally represents interactions and data associated with a stream object in accordance with aspects of the subject matter described herein. The upper area 405 shows input data to the stream object. The middle area 406 illustrates states of the stream object. The lower area 407 illustrates output data of the stream object. Time increases such that time 414 is after time 413 which is after time 412 which is after time 411.

The time axis is not drawn to scale in that the time between pairs of the times 411-414 are not necessarily equal. For example, there may be ten clock ticks between the time 411 and the time 412 and only one clock tick between the time 412 and the time 413.

The state 408 is an initial state. When a stream object is assigned to a streaming framework, the stream object may be initialized with the initial state 408. For example, if the stream operator performs a smoothing function, the stream operator may be seeded with a starting value.

At time 411, input $X_1$ is provided to the stream operator. In response, the stream operator may update its internal state from $S_0$ to $S_1$ and generate output $Y_1$. The stream operator may also indicate that it is not ready to be torn down yet.

At time 412, input $X_2$ is provided to the stream operator. In response, the stream operator may update its internal state from $S_1$ to $S_2$ and generate no output. The stream operator may also indicate that it is to be activated at time $T_1$ if it is not activated in response to stream data prior to $T_1$. Indicating that it wants to be activated at a future time may also serve to indicate that it is not ready to be torn down yet.

At time 413, the stream object is again activated in response to a time event ($T_1$) occurring. Note that no stream data caused the stream object to be activated earlier. At time 412, an indication that the time is now $T_1$ is provided to the stream object. In response, the stream object may update its state from $S_1$ to $S_2$ and generate output $Y_2$. The stream operator may also indicate that it is not ready to be torn down yet.

A time event may be used to tell a stream object that time has progressed until the specified time of the time event. This is useful in several situations. For example, if events with payloads are not being received (e.g., there is a "lull" in the stream), without time events there may be no indication of how much time has moved forward for the stream. When time events are used, however, a stream object may ask to be activated at a future time. If no events with payloads are received before the future time, the stream object may still be activated by a time event. For example, if a stream object is waiting for another event with a payload at or before a specified time and the event does not occur at or before the specified time, the stream object may want to be informed of this.

As another example, if a stream contains events that are out of order (i.e., events that are not strictly increasing in terms of timestamps), a time event may be used to guarantee that no event received in the future will have a timestamp earlier than the timestamp of the time event. The stream object may use the time event to take certain actions (e.g., re-order already received events) without needing additional logic to account for future events (with earlier timestamps) that might destroy the ordering.

At time 414, input $X_3$ is provided to the stream operator. In response, the stream operator may update its internal state from $S_3$ to $S_4$ and generate output $Y_3$ and $Y_4$. If the stream operator no longer needs its state information, the stream operator may also indicate that it is ready to be torn down.

Figure 5:
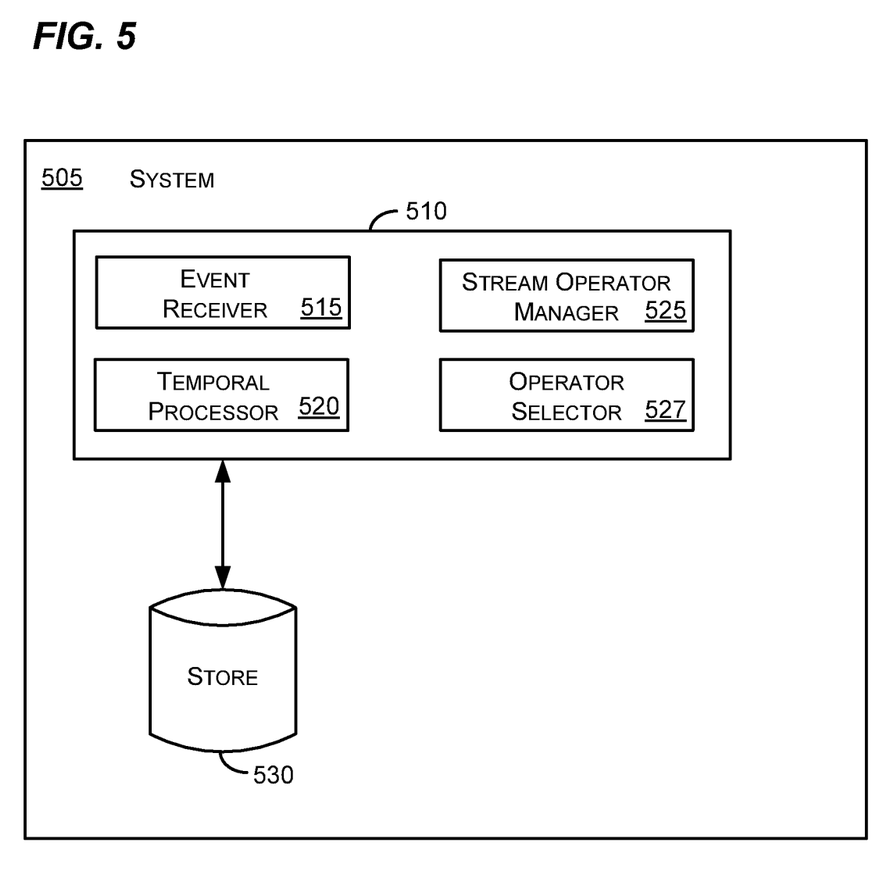
FIG. 5 is a block diagram that generally represents a system configured in accordance with aspects of the subject matter described herein.

FIG. 5 is a block diagram that generally represents a system configured in accordance with aspects of the subject matter described herein. The components illustrated in FIG. 5 are exemplary and are not meant to be all-inclusive of components that may be needed or included. In other embodiments, the components described in conjunction with FIG. 5 may be included in other components (shown or not shown) or placed in subcomponents without departing from the spirit or scope of aspects of the subject matter described herein. In some embodiments, the components and/or functions described in conjunction with FIG. 5 may be distributed across multiple devices.

Turning to FIG. 5, the system 505 may include a stream engine 510, a store 530, and other components (not shown). The stream engine 510 may include an event receiver 515, a temporal processor 520, a stream operator manager 525, an operator selector 527, and other components (not shown).

The system 505 may include one or more computing devices that host the components mentioned above. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured host the components of the system 505 comprises the computer 110 of FIG. 1.

The various components may be located relatively close to each other or may be distributed across the world. The various components may communicate with each other via various networks including intra- and inter-office networks. In addition, an individual component may be distributed. For example, different partitions of a stream may be hosted on different cores, different processes, different machines, or the like.

The store 530 provides access to data relevant to the stream engine 510. Such data may include, for example, state data, code of stream objects, input data, output data, configuration data, other data, and the like. The store 530 may be implemented with a file system, database, volatile memory such as RAM, other storage, some combination of the above, and the like and may be distributed across multiple devices. The store 530 may be external, internal, or include components that are both internal and external to an apparatus of the system 505.

The event receiver 515 may be operable to receive stream data for a streaming event. The stream data includes a timestamp and potentially a payload of data. The event receiver 515 may receive an event from an event source. An event source may be thought of as a component that generates an event. An event source may include a source external to the system 505, a stream object of the system 505, another source, or the like.

The temporal processor 520 is a component that is operable to order streaming events deterministically. In one embodiment, the temporal processor may implement the following algorithm:

```
// I = input queue which may include time events and payloads
// O = output queue
// N = queue of stream operators that want to be activated at certain times
// Scheduled = Time slot is allocated to executing stream object
// SO = Stream Object
Run( )
{
    while (scheduled && !I.IsEmpty)
    {
        event = I.Dequeue( );
        // Part 1
        // First find and process all stream operators that want to
        // activated at or before Timestamp of current event
        foreach (<ActivationTime, SO >
        in N.ScanUpToAndIncluding(event.TimeStamp))
        {
            N.Remove(SO);
            ProcessEvent(SO, new ActivationEvent(ActivationTime));
        }
        // Part 2
        //Already called all stream objects that want to be called at
        or before ActivationTime
        // Now process event
        if (event is ActivationTime only)
        {
            O.Enqueue(event); //Queue event to operator/outside world
        }
        else
        {
            // find corresponding stream object
            if (!S.TryGetValue(Index, DataStructure))    // lookup in
                                                        //data structure
                                                        to find user
                                                        state
            {
                state = InitializeUserState( );
                S.Add(Index, state);   // Update data structure
                                       // so you can find state next
                                       time through
            }
```

```
        ProcessEvent(SO, event);  //Pass key and value so
        engine can determine
        which stream object
    }
  }
}
```

In part 1 of the algorithm above, the temporal processor:
1. Receives an event associated with a timestamp;
2. Determines a stream object to which the event is to be sent (via the operator selector 527); and
3. Informs each stream object that has requested activation at timestamps up to the timestamp of the event prior to processing the event by the determined stream object.

Upon activation, a given stream object may request that it be activated again before the timestamp. In this case, the temporal processor may call the given stream object multiple times before processing the event by the determined stream object if the given stream object indicates one or more additional activation times that are prior to or equal to the timestamp.

The operator selector 527 determines a stream object to which to send stream data for a streaming event. When there is only one stream object to send the stream data to, determining the stream object may include finding a handle, pointer, queue, or the like associated with the stream object. When there are multiple stream objects to which to send stream data, the operator selector 527 may use a data structure, set of conditions, or the like that indicates the stream object(s) to which to send the stream data.

When the stream data includes a timestamp only, the operator selector 527 may determine stream objects, if any, that have requested to be activated at or before the timestamp. To determine these stream objects, the operator selector 527 may use a data structure that indicates activation times for stream objects where an entry (e.g. portion) in the data structure indicates an activation time for a corresponding stream object.

The stream operator manager 525 may be operable to instantiate a stream object, if needed, provide the stream data to the stream object, receive output data, if any, from the stream object, and tear down the stream object after the stream object no longer needs to maintain state data. In one implementation, the stream operator manager 525 may be further operable to query a stream object to ask whether the stream object still needs to maintain state data. In another implementation, the stream object may provide this information without being queried as described previously.

Figure 6:
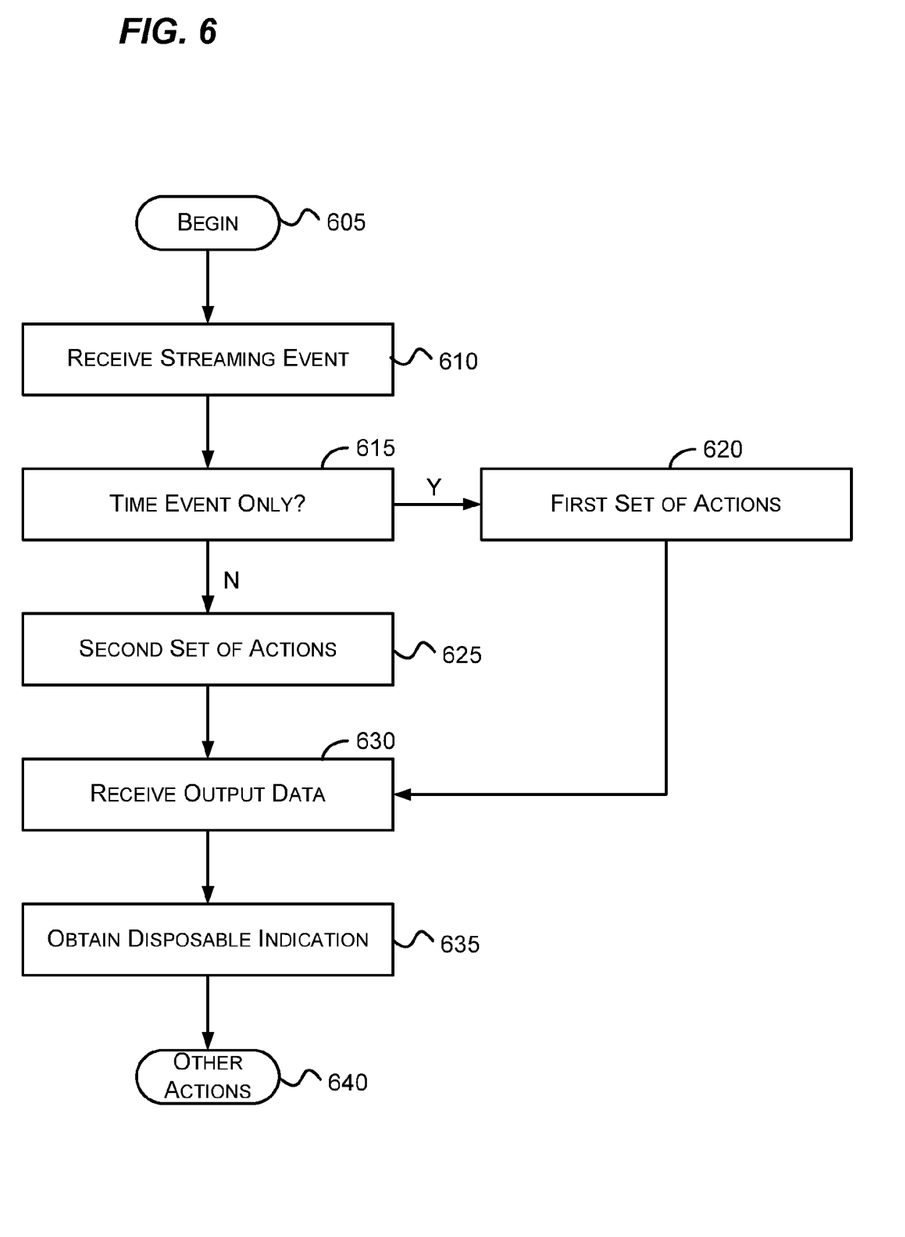
FIGS. 6-7 are flow diagrams that generally represent exemplary actions that may occur in accordance with aspects of the subject matter described herein.
Figure 7:
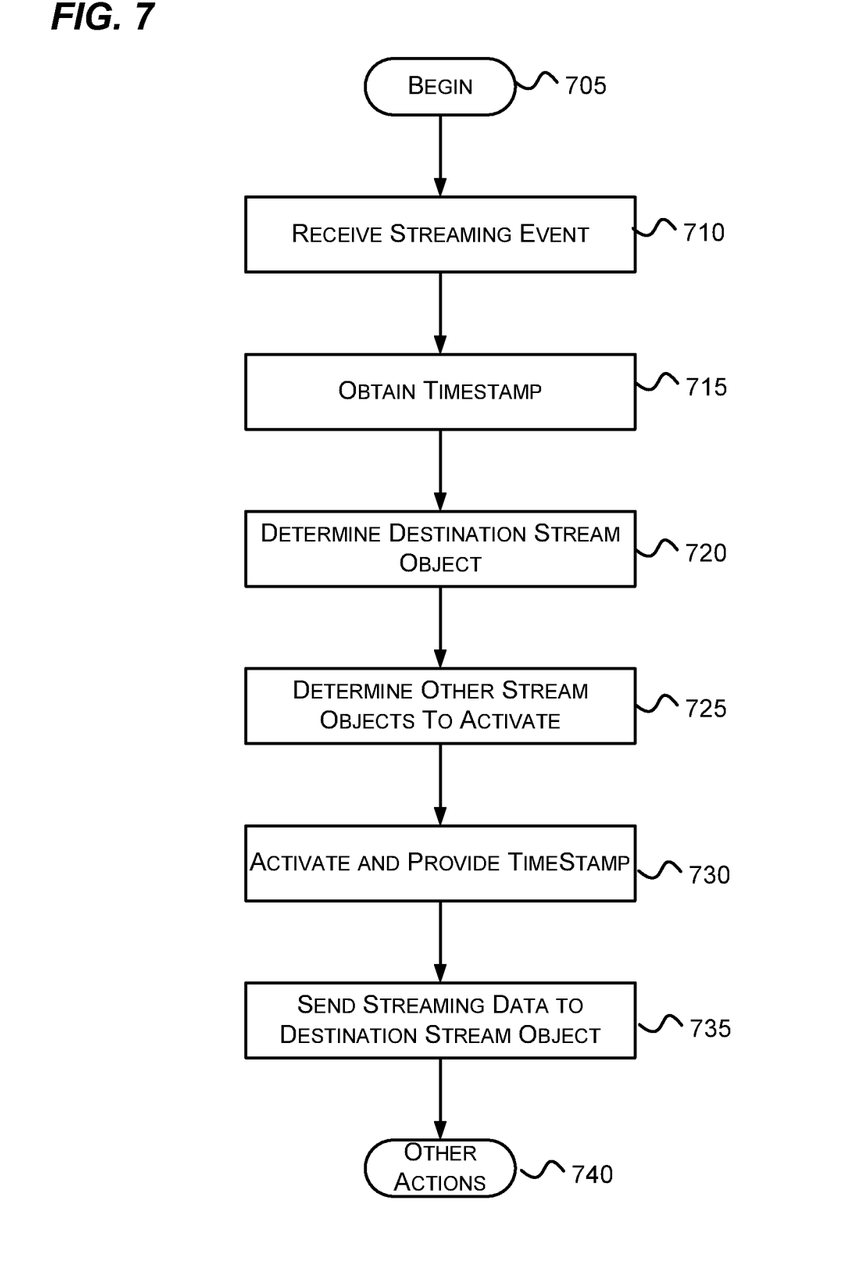

FIGS. 6-7 are flow diagrams that generally represent exemplary actions that may occur in accordance with aspects of the subject matter described herein. For simplicity of explanation, the methodology described in conjunction with FIGS. 6-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 6, at block 305, the actions begin. At block 610 a streaming event is received. For example, referring to FIG. 5, the event receiver 515 may receive streaming data from an event source such as a file, process, memory location, or the like.

Some streaming events will indicate the advancement of time only. These streaming events may include a timestamp but no payload. Such streaming events are sometimes referred to as a time only event.

Other stream events will also include a payload. In this case, receiving a streaming event that is not a time event only may include receiving a timestamp and a field that includes data. The timestamp may be, for example, an integer.

Furthermore, a time only event may be synthesized at need. When a streaming event that includes a payload is received, one or more time only events may be created to send to stream objects that have indicated that they are to be activated at or before the time of the streaming event. Furthermore, multiple time only events may be generated for a single stream operator in response to a streaming event that includes a payload. This may occur, for example, if after being activated, the stream object indicates one or more new times at which it is to be activated where the new times are still before the time of the streaming event that includes the payload.

At block 615, if the event is a time event only, the actions continue at block 620; otherwise, the actions continue at block 625. At block 602, a first set of actions is performed. This set of actions may, for example, include:

1. Determining a first set of zero or more stream objects that have indicated interest in receiving the time event. Such objects may include objects that have indicated that they want to be activated at or before the time event. Determining this set of zero or more stream objects may be done by using a data structure that includes activation times as previously indicated. Determining a first set of zero or more stream objects that have indicated interest in receiving the time event may include querying each stream object of the first set to ask a first time at which to activate the stream object if no other stream data for the stream object is received first.

2. Determining whether a stream object of the first set is already instantiated, and if not, instantiating the stream object prior to sending an indication of the time event.

3. Sending an indication of the time event to each of the stream objects of the first set. For example, referring to FIG. 5, the stream operator manager 525 may instantiate, as needed, and send stream data to each stream object of the first set. This stream data may include a timestamp before or at the timestamp of the time event.

At block 625, a second set of actions is performed. This set of actions may, for example, include:

1. Determining a second set of zero or more stream objects that are to receive stream data corresponding to the streaming event. The stream data may include a timestamp and a payload. For example, referring to FIG. 3, when the streaming framework component 305 receives input data, it may determine which of the stream objects 310 to which to provide the input data based on the input data and partitioning data/conditions. For example, if the stream data is from a country with a starting letter of U, the streaming framework component 305 may provide the input data to the stream object that handles stream data starting with U.

Determining the second set of zero or more stream objects that are to receive stream data corresponding to the streaming event may include applying a partition function to the stream data for each stream object of the second set. The partition function may apply a set of zero or more conditions to the stream data to determine whether a stream object is to receive the stream data.

2. Determining whether a stream object of the second set is already instantiated, and if not, instantiating the stream object prior to providing the stream data to the stream object.

3. Sending the stream data to each of the zero or more stream objects of the second set. For example, referring to FIG. 3, the stream data may be sent to one or more of the stream objects 310.

At block 630, output data, if any, is received from each stream object to which stream data was sent. For example, referring to FIG. 3, the streaming framework component 315 may receive output data from the first or second sets of stream objects mentioned above.

At block 635, an indication is obtained from each stream object to which stream data was sent as to whether the stream object is now disposable. Disposable is another way of saying that the stream object may be torn down as it no longer needs state data between invocations of the stream object as mentioned previously. For example, referring to FIG. 3, the streaming framework component 315 may obtain an indication of whether a stream object is disposable from each of the stream objects in the first or second sets of stream objects mentioned above.

At block 640, other actions, if any, may be performed. For example, these actions may include:

1. Freeing memory associated with stream objects that have indicated that they are now disposable (e.g., ready to be torn down). A destroy method of the stream object may be called prior to freeing memory associated with the stream object. In one embodiment, a disposable stream object may be recycled. For example, in a system in which a stream object processes countries starting with "U", if the stream object indicates that it is disposable, instead of being torn down, it may be assigned to countries starting with "V".

2. An action that may occur before block 615 (and perhaps before block 610) is to receive a set of streaming events, potentially out of temporal order, and ordering the streaming events in temporal order before performing the first or second set of actions. An operator author (e.g., a person who creates a stream operator) may indicate whether stream events are received in temporal order or potentially out of temporal order at a stream operator. When temporal ordering is desired, this ordering may be done by the temporal processor 520 of FIG. 5.

The other actions mentioned above are not intended to be all-inclusive or exhaustive. Indeed, based on the teachings herein, those skilled in the art may recognize other actions that may be performed without departing from the spirit or scope of aspects of the subject matter described herein.

Turning to FIG. 7, at block 705, the actions begin. At block 710, a streaming event is received. For example, referring to FIG. 5, the event receiver 515 may receive streaming data from an event source such as a file, process, memory location, or the like.

At block 715, a timestamp of the streaming event is obtained. For example, referring to FIG. 5, the event receiver 515 may deduce (e.g., based on data available to the stream engine 510), extract (e.g., from the streaming event), request (e.g., from the event source), or perform other actions to obtain a timestamp of the streaming event.

At block 720, a destination stream object is determined to which to provide data corresponding to the stream object. For example, referring to FIG. 3, the stream object 321 is the only stream object that a stream event can be provided to if the streaming event comes from the stream object 320. In contrast, a streaming event that comes from the stream object 304 may be provided to one or more of the stream objects 310. Determining which of the stream objects 310 to provide the streaming event may be performed, for example, via a partition function as previously described.

At block 725, a determination is made of zero or more stream objects that have requested activation at an activation timestamp at or before the timestamp of the streaming event. For example, referring to FIG. 5, the operator selector 527 may determine stream objects, if any, that have requested to be activated at or before the timestamp.

At block 730, the zero or more stream objects mentioned above may be activated and informed that the activation timestamp has occurred. For example, referring to FIG. 5, the stream operator manager 525 may instantiate, activate, and inform the zero or more stream objects identified above of the streaming event.

At block 735, streaming data is provided to the destination stream object determined at block 720. If the streaming event is a time event without a payload, the stream object may be informed that the time event has occurred and output, if any, may be received from the stream object. If the streaming event is a time event with a payload, the stream object may be provided the data corresponding to the streaming event, and output, if any, may be received from the stream object.

At block 740, other actions, if any, may be performed. Other actions may include, for example, obtaining data regarding whether a stream object wants to be activated at a future time, obtaining an indication of whether a stream object is disposable, disposing of stream objects that have indicated that they are disposable, other actions, and the like.

As can be seen from the foregoing detailed description, aspects have been described related to stream operators. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
 receiving a streaming event;
 if the streaming event is a time only event, then performing a first set of actions, comprising:
  determining a first set of stream operators that have indicated interest in receiving the time only event, and
  sending an indication of the time only event to each of the stream operators of the first set when the first set includes at least one stream operator;
 if the streaming event is not a time only event, then performing a second set of actions, comprising:
  determining a second set of stream operators that are to receive stream data corresponding to the streaming event, and
  sending the stream data to each of the stream operators of the second set when the second set includes at least one stream operator; and
 if the streaming event is or is not a time only event, performing additional actions, comprising:
  receiving output data from at least one of the stream operators to which the indication of the time only event or the stream data was sent, the at least one of the stream operators being configured to operate on the indication of the time only event or the stream data to generate the output data, and obtaining an indication from each stream operator to which the indication of the time only event or the stream data was sent whether the stream operator is now disposable.

2. The method of claim 1, wherein performing a first set of actions further comprises determining whether a stream operator of the first set is already instantiated, and if not, instantiating the stream operator prior to sending an indication of the time only event.

3. The method of claim 2, further comprising if the stream operator of the first set indicates that it is now disposable, freeing memory associated with the stream operator.

4. The method of claim 3, further comprising calling a destroy method of the stream operator prior to freeing memory associated with the stream operator.

5. The method of claim 1, wherein determining a first set of stream operators that have indicated interest in receiving the time only event comprises querying, when the first set includes at least one stream operator, each stream operator of the first set to ask a first time at which to activate the stream operator if no other stream data for the stream operator is received first.

6. The method of claim 1, wherein receiving a streaming event that is not a time only event comprises receiving a timestamp and a field that includes data, wherein the timestamp is an integer.

7. The method of claim 1, wherein determining a second set of stream operators that are to receive stream data corresponding to the streaming event comprises, when the second set includes at least one stream operator, for each stream operator of the second set applying a partition function to the stream data, the partition function applying a set of conditions to the stream data to determine whether a stream operator is to receive the stream data.

8. The method of claim 1, wherein the second set of actions further comprises determining whether a stream operator of the second set is already instantiated, and if not, instantiating the stream operator prior to providing the stream data to the stream operator.

9. The method of claim 1, further comprising receiving other streaming events out of temporal order, and ordering the streaming events in temporal order before performing the first or second set of actions.

10. In a computing environment, a system, comprising:
an event receiver operable to receive stream data for a streaming event, the stream data including a timestamp with or without a payload of data;
an operator selector operable to determine a stream operator to which to send the stream data, the stream operator being configured to operate on the stream data to generate output data; and
an operator manager operable to instantiate the stream operator if needed, provide the stream data to the stream operator, receive the output data from the stream operator, and tear down the stream operator after the stream operator no longer needs to maintain state data.

11. The system of claim 10, further comprising a temporal processor operable to order streaming events that are received out of temporal order into a temporal order such that stream data for any two stream events that are to be provided to the stream operator, a first stream event having a first timestamp is provided to the stream operator before stream data for a second stream event having a second timestamp if the first timestamp is temporally before the second timestamp.

12. The system of claim 10, further comprising a temporal processor operable to order streaming events deterministically.

13. The system of claim 12, wherein the temporal processor is operable to order streaming events deterministically by performing actions, comprising:
receiving an event associated with a timestamp; and
informing each stream operator that has requested activation at timestamps up to the timestamp of the event prior to processing the event.

14. The system of claim 13, wherein the temporal processor is operable to call a given stream operator multiple times before processing the event if the given stream operator indicates one or more additional activation times that are prior to or equal to the timestamp.

15. The system of claim 10, wherein the operator selector is operable to determine a stream operator to which to send the stream data by using a data structure that indicates activation times for stream operators, an entry in the data structure indicating an activation time for a corresponding stream operator.

16. The system of claim 10, wherein the operator manager is further operable to query the stream operator to ask whether the stream operator still needs to maintain state data.

17. A computer storage memory having computer-executable instructions, which when executed perform actions, comprising:
receiving a streaming event;
obtaining a timestamp of the streaming event;
determining a stream operator to which to provide data corresponding to the streaming event, the stream operator being configured to operate on the data to generate output data;
prior to providing the streaming event to the stream operator, performing a first set of actions, comprising:
determining a set of stream operators that have requested activation at an activation timestamp at or before the timestamp,
when the set includes at least one stream operator, activating each stream operator in the set and informing each stream operator in the set that the activation timestamp has occurred; and
after the first set of actions has completed, performing a second set of actions using the stream operator.

18. The computer storage memory of claim 17, wherein performing the second set of actions comprises if the streaming event is a time event without a payload, informing the stream operator that the time event has occurred and receiving the output data from the stream operator.

19. The computer storage memory of claim 17, wherein performing the second set of actions comprises if the streaming event is a time event with a payload, instantiating the stream operator, providing the data corresponding to the streaming event to the stream operator, and receiving the output data from the stream operator.

20. The computer storage memory of claim 17, wherein the second set of actions comprises tearing down each of the stream operators that has indicated that it is disposable.

* * * * *